US006747815B2

(12) United States Patent
Takatsuki

(10) Patent No.: US 6,747,815 B2
(45) Date of Patent: Jun. 8, 2004

(54) RETROFOCUS WIDE-ANGLE LENS

(75) Inventor: Akiko Takatsuki, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 4 days.

(21) Appl. No.: 10/348,754

(22) Filed: Jan. 23, 2003

(65) Prior Publication Data

US 2003/0156335 A1 Aug. 21, 2003

(30) Foreign Application Priority Data

Jan. 29, 2002 (JP) ........................................ 2002-019737

(51) Int. Cl.[7] .............................. G02B 9/00; G02B 9/04
(52) U.S. Cl. ........................................ 359/749; 359/793
(58) Field of Search ................................ 359/749–753, 359/762, 770, 793, 820

(56) References Cited

U.S. PATENT DOCUMENTS

| | | | |
|---|---|---|---|
| 4,381,888 A | * | 5/1983 | Momiyama ................ 359/749 |
| 4,566,764 A | * | 1/1986 | Matsuo ..................... 359/750 |
| 5,159,493 A | | 10/1992 | Tsutsumi |
| 5,858,898 A | | 1/1999 | Nakahara et al. |
| 6,621,645 B2 | * | 9/2003 | Sato ........................ 359/749 |

FOREIGN PATENT DOCUMENTS

| | | |
|---|---|---|
| JP | 04-118612 | 4/1992 |
| JP | 2000-131606 | 5/2000 |

* cited by examiner

*Primary Examiner*—Georgia Epps
*Assistant Examiner*—M. Hasan
(74) *Attorney, Agent, or Firm*—Arnold International; Jon W. Henry; Bruce Y. Arnold

(57) ABSTRACT

A retrofocus wide-angle lens includes a first lens group of negative refractive power, a diaphragm, and a second lens group of positive refractive power. The first lens group includes an object-side lens group, a middle lens group, and an image-side lens group. The object-side lens group includes a plurality of negative lens components and a positive meniscus lens component with its convex surface on the image side. The middle lens group satisfies a particular focal length condition and includes a negative lens component at the object side. The image-side lens group includes a negative lens element and a positive lens element. The first and second lens groups include lens elements of opposite refractive power that are made of anomalous dispersion glass so as to provide chromatic aberration correction and to compensate for variations in refractive index with temperature change that would otherwise cause the focal length to vary with temperature.

20 Claims, 5 Drawing Sheets

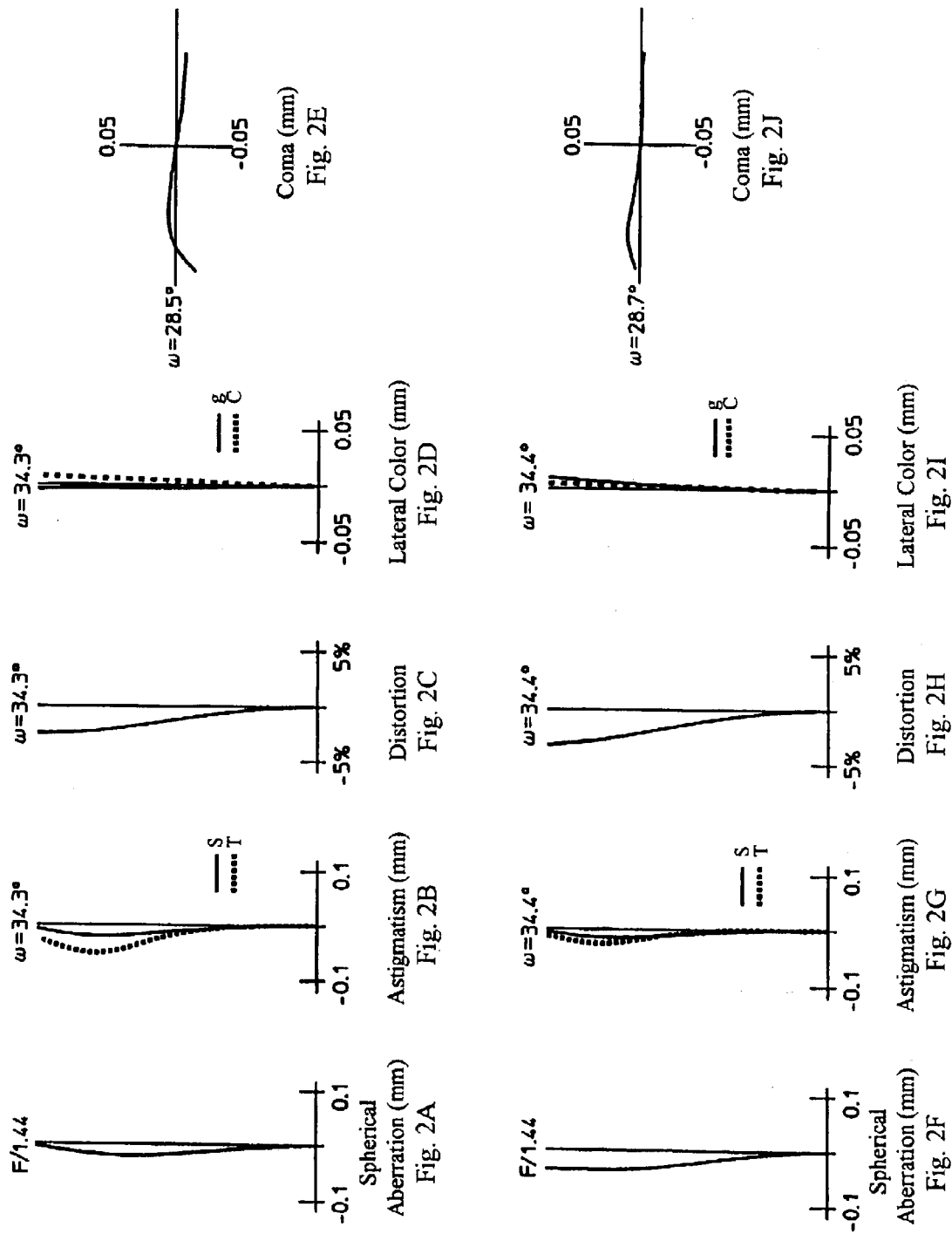

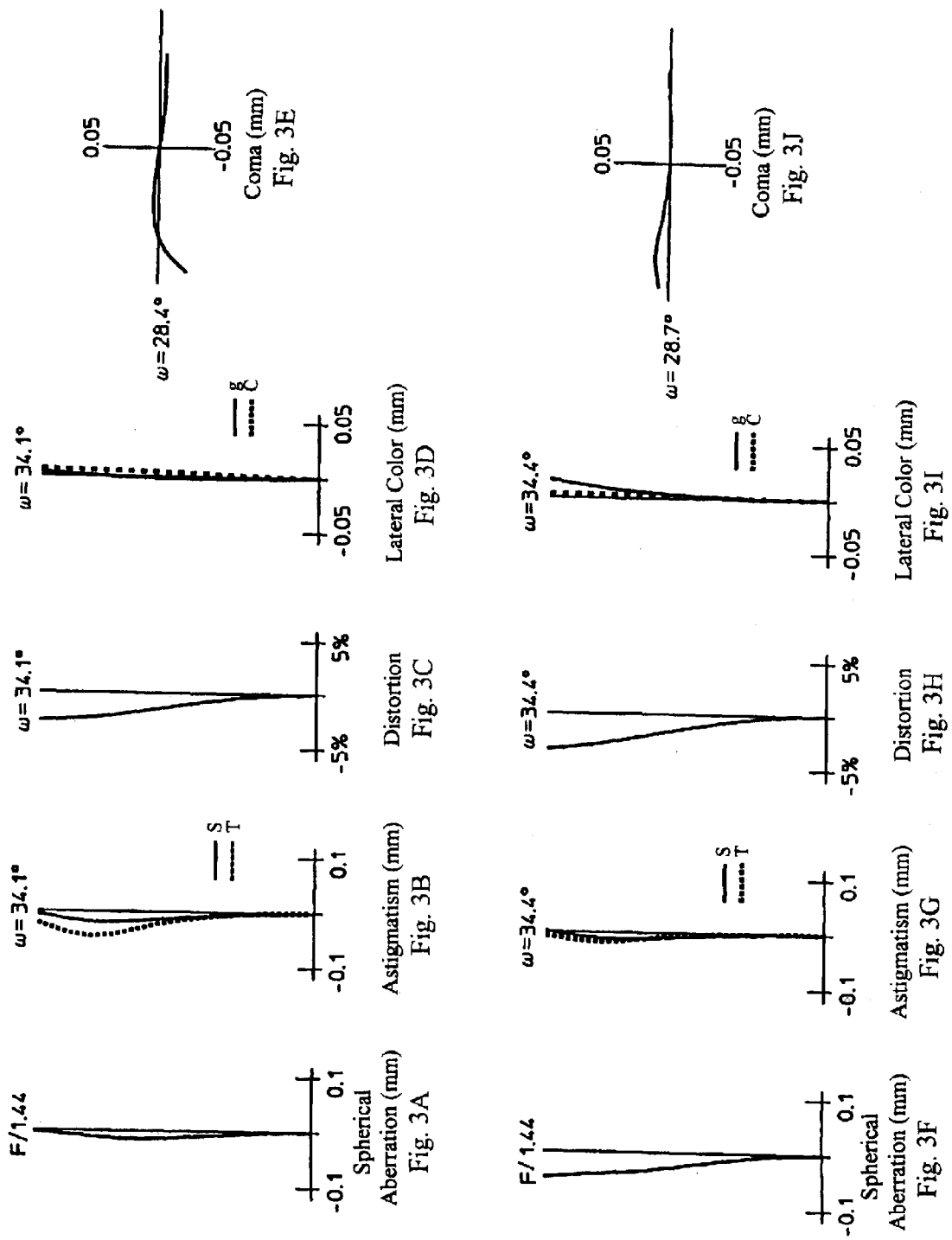

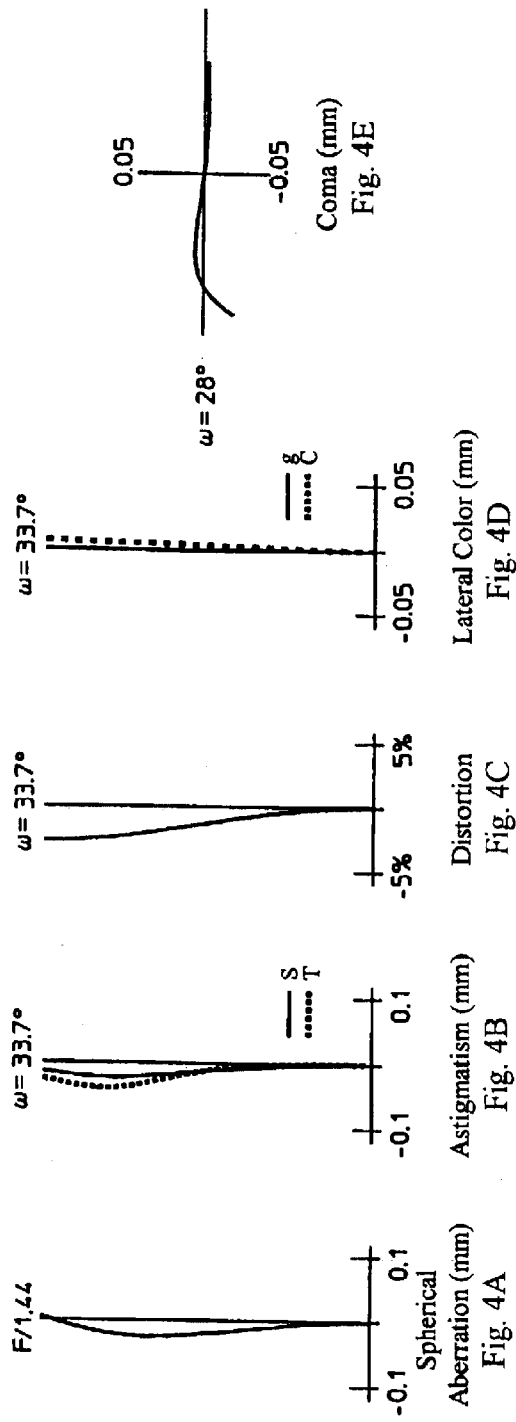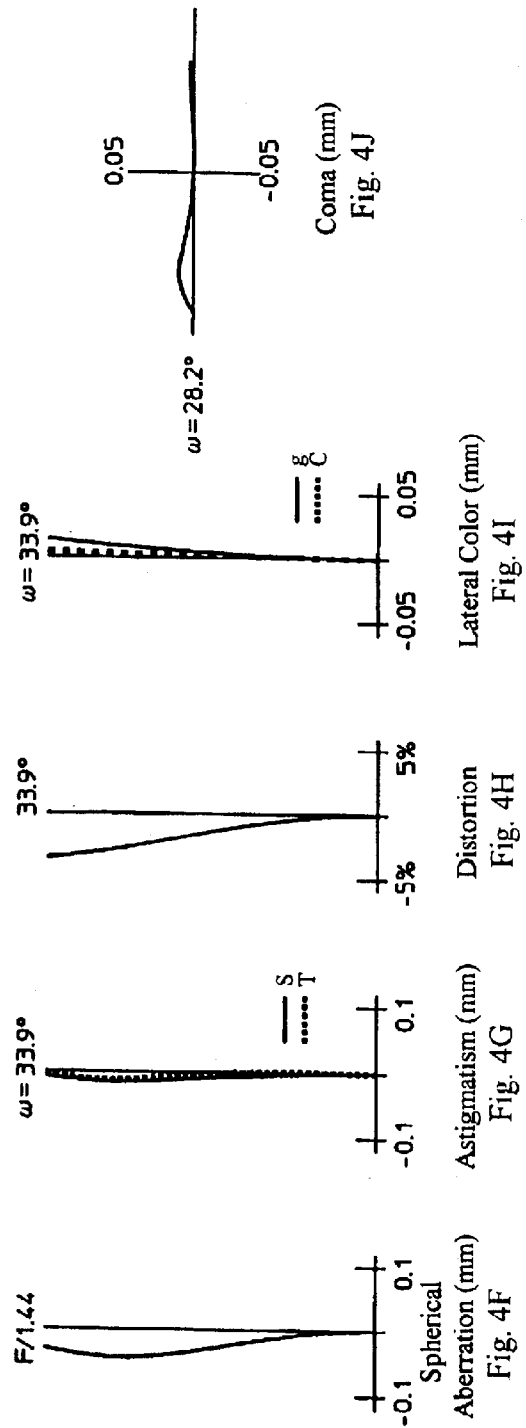

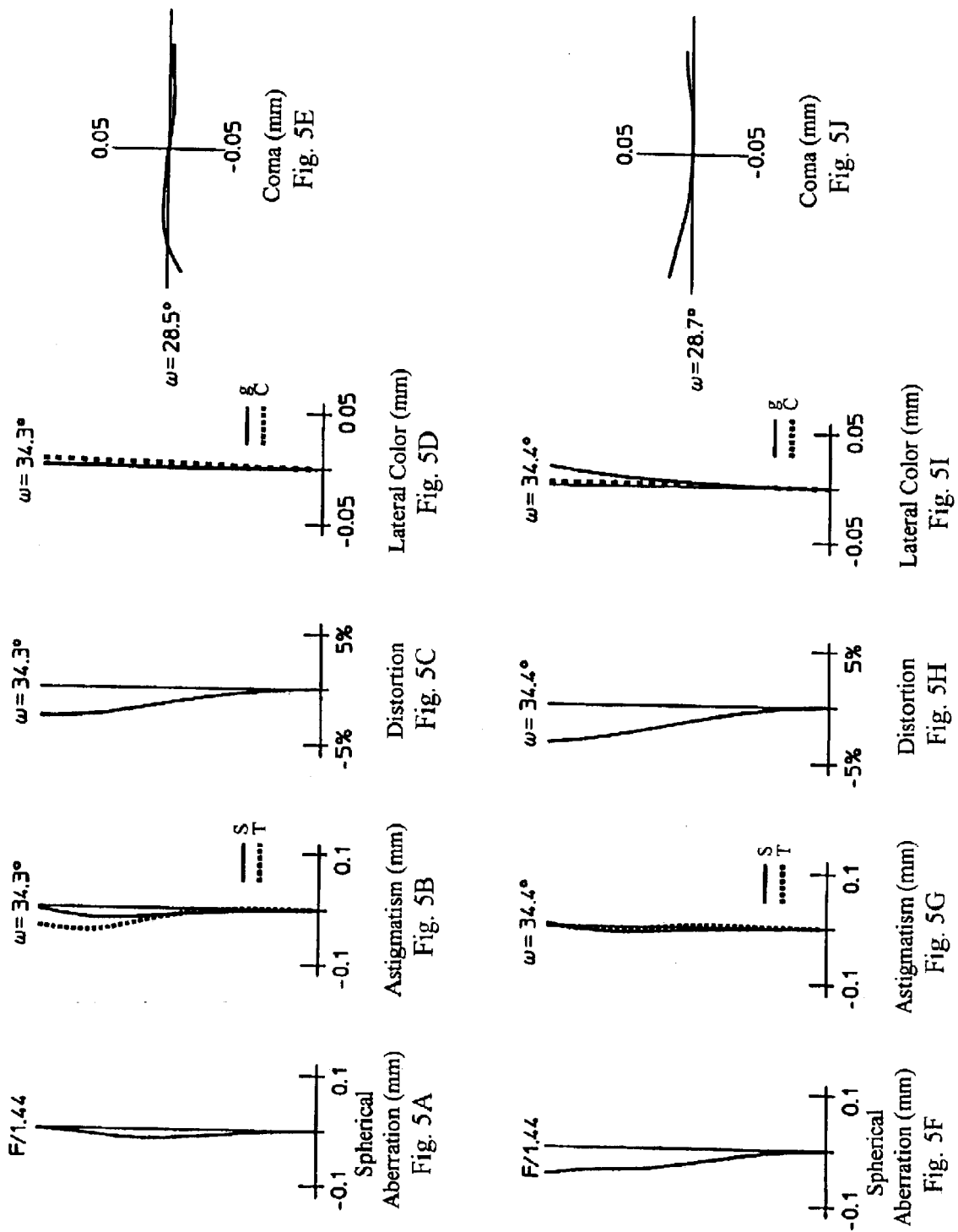

RETROFOCUS WIDE-ANGLE LENS

BACKGROUND OF THE INVENTION

Recently, an image pickup camera for broadcast TV, e.g., a so-called E cinema camera capable of recording an image for presentation on a cinema screen, has been developed. A wide-angle imaging lens used in an E cinema camera requires a wider angle and higher performance over the entire image plane than a common image pickup camera for broadcast TV.

Moreover, when a fixed solid-state image pickup element is used in such an E cinema camera, similar to its use in a common image pickup camera for broadcast TV, a low-pass filter and an infrared rejecting filter may also be provided between the imaging lens and the solid-state image pickup element. In that case, room for those filters must be provided in the back focus region of the imaging lens. Furthermore, when imaging in color with an image pickup element for each primary color, a color separation prism is provided in front of the solid-state image pickup elements, and providing room for that prism requires an even longer back focus of the imaging lens. Additionally, internal focusing is preferably used to reduce variations in aberrations and field angle usually associated with focusing in an image pickup camera for broadcast TV.

Japanese Laid-Open Patent Application H04-118612 discloses a retrofocus wide-angle lens that provides very good performance even when the field angle is 90° or more. However, the front lens group of that wide-angle lens is too large for the desired compactness of the image pickup camera. For example, in the retrofocus wide-angle lens of Embodiment 1 of that application, with a focal length of 5.0 mm, an $F_{NO}$ of 1.8, and field angle of 95.5° (for an image circle of 11.0 mm), the optically effective diameter of the first lens group is 95 mm. However, there is a demand for making it about half that size.

Additionally, the retrofocus wide-angle lens disclosed in Japanese Laid-Open Patent Application H04-118612 is constructed so that focusing is performed by moving lens components in both front and rear lens groups, which requires making complicated mechanisms for focusing. Furthermore, focusing causes significant variations in field angle, which is undesirable in E cinema cameras.

As mentioned above, internal focusing is used in order to reduce variations in aberrations and field angle with focusing. Besides the retrofocus wide-angle lens disclosed in Japanese Laid-Open Patent Application H04-118612, Japanese Laid-Open Patent Application 2000-131606 discloses a similar retrofocus wide-angle lens that uses internal focusing with a positive lens group and a negative lens group that are included within a first lens group. Focusing is achieved by moving the positive lens group that is on the image side of the negative lens group. However, for the retrofocus wide-angle lens described, the ratio of back focus to the focal length of the entire retrofocus wide-angle lens (i.e., the retrofocus ratio) is about 2.6, which is not always sufficient.

In addition, with retrofocus wide-angle lenses as described above, correction of chromatic aberration is very important. In responding to this requirement, the use of anomalous dispersion glass in a positive lens element of the second lens group is known. The term "anomalous dispersion glass" is used herein to mean glass having a large deviation in the partial dispersion ratio $\Delta \theta g, F$ (i.e., a large 'anomalous dispersion') from a line connecting normal glasses F2 and K7 when plotted on a graph with the Y-axis being the partial dispersion ratio ($\theta g, F$) and the X-axis being the Abbe number $v_d$. For a complete explanation of what the 'partial dispersion ratio' is and how it is obtained, please see U.S. Pat. No. 5,858,898 (especially FIG. 1 and the paragraph spanning columns 6 and 7), the contents of which are herein incorporated by reference.

BRIEF SUMMARY OF THE INVENTION

The present invention relates to a high performance retrofocus wide-angle lens, suitable for TV-type cameras, and particularly relates to a high performance retrofocus wide-angle lens with a long back focus and with a relatively small, optically effective diameter of the lens group at the object side of the retrofocus wide-angle lens that assists in obtaining the high compactness desired in that type of camera. Further, the present invention relates to such a high performance retrofocus wide-angle lens that reduces variations in aberrations and field angle with focusing and allows internal focusing with simple mechanisms. Additionally, the present invention relates to such a high performance retrofocus wide-angle lens that corrects chromatic aberrations without allowing corresponding large changes in the back focal length that are caused by changes in temperature in retrofocus lenses in prior art cameras. The present invention is especially useful for broadcast TV cameras such as E cinema cameras.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A–2E show aberrations of Embodiment 1 of the retrofocus wide-angle lens of the present invention when focused at infinity;

FIGS. 2F–2J show aberrations of Embodiment 1 of the retrofocus wide-angle lens of the present invention when focused at the near point;

FIGS. 3A–3E show aberrations of Embodiment 2 of the retrofocus wide-angle lens of the present invention when focused at infinity;

FIGS. 3F–3J show aberrations of Embodiment 2 of the retrofocus wide-angle lens of the present invention when focused at the near point;

FIGS. 4A–4E show aberrations of Embodiment 3 of the retrofocus wide-angle lens of the present invention when focused at infinity;

FIGS. 4F–4J show aberrations of Embodiment 3 of the retrofocus wide-angle lens of the present invention when focused at the near point;

FIGS. 5A–5E show aberrations of Embodiment 4 of the retrofocus wide-angle lens of the present invention when focused at infinity; and FIGS. 5F–5J show aberrations of Embodiment 4 of the retrofocus wide-angle lens of the present invention when focused at the near point.

DETAILED DESCRIPTION OF THE INVENTION

Figure 1:
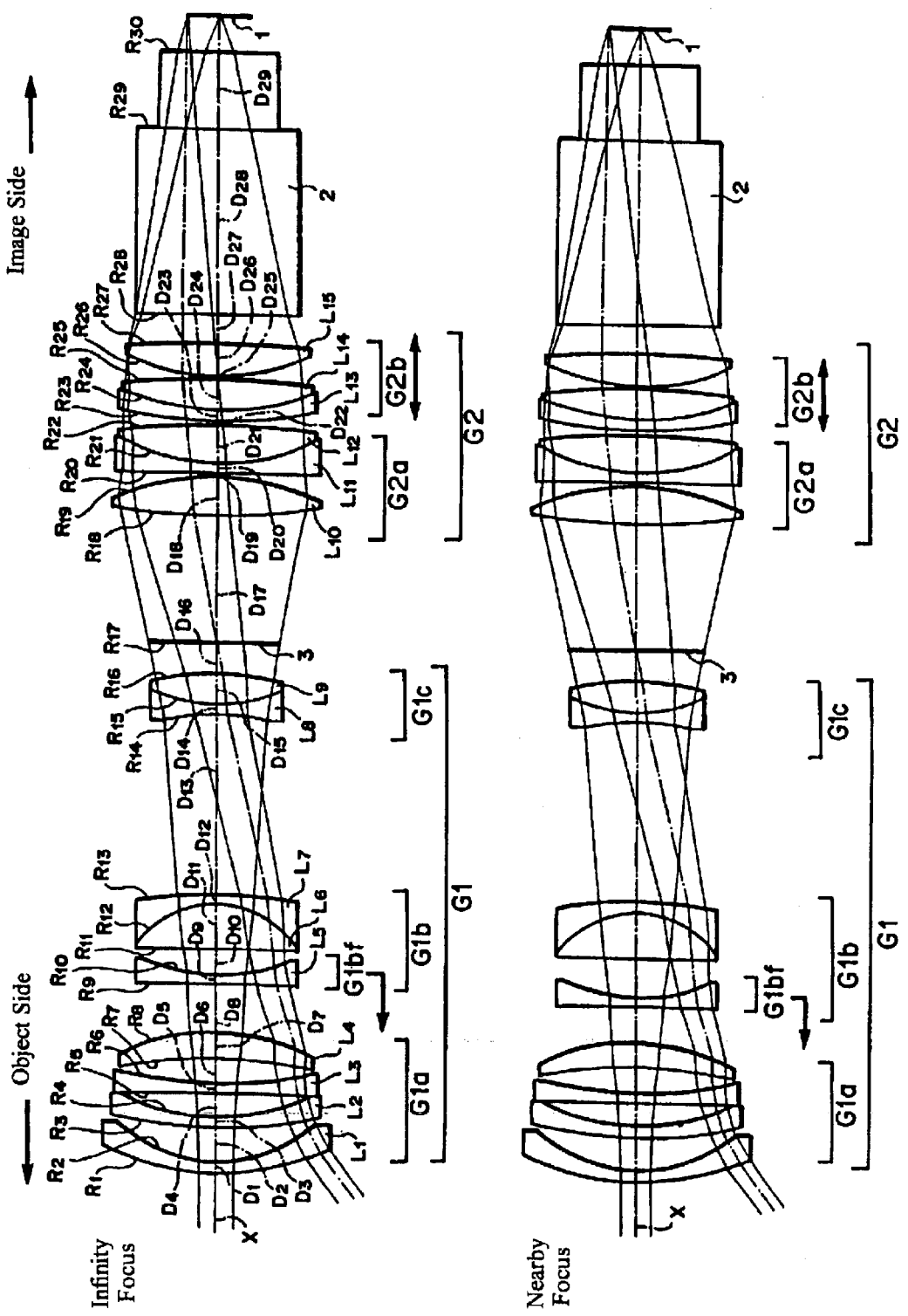
FIG. 1 shows a cross-sectional view of Embodiment 1 of the retrofocus wide-angle lens of the present invention, when focused at infinity (top) and at a nearby object (bottom)

First, definitions of the terms "lens element", "lens component" and "lens group" that relate to the following detailed description will be given. The term "lens element" is herein defined as a single transparent mass of refractive material having two opposed refracting surfaces, which surfaces are disposed at least generally transversely of the optical axis of the retrofocus wide-angle lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or, overall, are so close together that the spacings between adjacent lens surfaces of the different lens elements are so small that the spacings can be neglected in computing the optical image forming properties of the two or more lens elements. Thus some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

A general description of the retrofocus wide-angle lens of the present invention that pertains to all four embodiments of the invention will first be described with reference to FIG. 1 that shows Embodiment 1. In FIG. 1, lens elements are referenced by the letter L with a subscript denoting their order from the object side of the retrofocus wide-angle lens, from $L_1$ up to a maximum of $L_{15}$. Similarly, the radii of curvature of all the surfaces are referenced by the letter R with a subscript denoting their order from the object side, from $R_1$ up to a maximum of $R_{30}$. The on-axis surface spacings (along the optical axis X of the figure) of all the optical surfaces are referenced by the letter D with a subscript denoting their order from the object side, from $D_1$ to $D_{29}$, as shown in FIG. 1. However, Embodiment 4, that is not separately illustrated, includes an additional lens with two additional radii of curvature of the lens surfaces, creating two additional on-axis surface spacings.

The major lens groups are labeled G1 and G2, in order from the object side, and alphabetical order subscripts a, b, and c are added for lens groups divided from those lens groups, for example, lens groups G1a, G1b, and G1c, in their order from the object side. Additionally, lens group G1b is divided, in order from the object side, into a lens group G1bf that is moveable and other lens elements of lens group G1b that are stationary. The lens components belonging to each lens group are indicated by lower brackets adjacent the labels G1, G1a, etc., of the lens groups. A directional arrow in FIG. 1 associated with the bracket for lens group G1bf indicates the direction of movement of the lens group G1bf relative to other lens groups when the lens group G1bf is being focused from infinity to the near point.

The retrofocus wide-angle lens of the present invention is stored in a lens barrel of, for example, an image forming camera for E cinema. The retrofocus wide-angle lens of the present invention is formed of, in order from the object side, a first lens group G1 having negative refractive power as a whole, a diaphragm (or stop), and a second lens group G2 having positive refractive power as a whole. Further, the first lens group G1 includes, in order from the object side, an object-side lens group G1a that has a negative refractive power as a whole, a first light-receiving lens group G1b that has a negative refractive power as a whole, and a second light-receiving lens group G1c that has a negative refractive power as a whole. The object-side lens group G1a includes, in order from the object side, a plurality of negative lens components and at least one positive meniscus lens component with its convex lens surface on the image side. The first light-receiving lens group G1b includes, in order from the object side, an initial negative lens group G1bf that includes a negative lens component, and also includes a positive lens element and a negative lens element that are bonded together. The second light-receiving lens lens group G1c includes a lens component that includes a negative lens element and a positive lens element that have adjacent lens surfaces of the same curvature that are maintained in full overall contact or are separated by a thin layer of transparent adhesive (too thin to be considered in optical computations) that fixes the lenses together.

As shown in FIG. 1, the object-side lens group G1a may consist of three negative lens elements, $L_1$, $L_2$, $L_3$, on the object side of a single positive lens element $L_4$. That arrangement provides a wide-angle view with a small effective diameter of the lens elements of the object-side lens group G1a because the positive lens element immediately converges light rays exiting the negative lens elements from many different directions generally in the direction of the optical axis X. As shown in FIG. 1, the imaging light entering the retrofocus wide-angle lens passes through the lens group G1, a diaphragm 3, the lens group G2, and a color separation prism and filters (indicated by reference numeral 2 in FIG. 1), generally in a direction along the optical axis X, until the imaging light is focused onto the image plane 1.

Furthermore, the retrofocus wide-angle lens is an inner-focus type lens. Focusing is accomplished by moving the negative meniscus lens component, which may be a single negative meniscus lens element $L_5$ of initial negative lens group G1bf, as shown in FIG. 1, toward the object side when focusing from infinity to a near point. Because focusing may be obtained by moving only a single lens component, in fact, a single lens element, in this case lens element $L_5$, only a small amount of drive power is necessary to perform focusing, thereby making it possible to provide simple mechanical mechanisms and to reduce manufacturing costs. Furthermore, the arrangement helps reduce aberrations and variations in field angle with focusing.

Further, preferably the following condition is satisfied:

$$0.05 < fn/flb < 0.50 \qquad \text{Condition (1)}$$

where
  fn is the focal length of the initial negative lens group G1bf; and
  flb is the focal length of the entire first light-receiving lens group G1b.

If the above ratio of focal lengths is less than the lower limit of Condition (1), the coma of the retrofocus wide-angle lens increases. On the other hand, if the above ratio of focal lengths exceeds the upper limit of Condition (1), the variations of the location of the tangential image plane along the optical axis that occur due to focusing increase. Also, preferably the second lens group G2 includes a positive lens element made from anomalous dispersion glass.

Further, preferably the first lens group G1 includes a negative lens element made of a material that has a refractive index N that satisfies the following condition:

$$dN/dT < -0.000005 \qquad \text{Condition (2)}$$

where dN/dT is the change in the refractive index with change in temperature T, in degrees Celsius.

When Condition (2) is satisfied, chromatic aberration is favorably collected without excessive variations in the position of the back focus of the retrofocus wide-angle lens with temperature changes. The changes in the back focus with temperature change that are caused by the negative lens element of the first lens group G1 compensate for the changes in the back focus that are due to a positive lens element, of the second lens group G2, being made of anomalous dispersion glass. If Condition (2) is not satisfied, the compensation is not sufficient and large changes in the position of the back focus may occur.

The second lens group G2 includes, in order from the object side, an infinity-related lens group G2a and a movable lens group G2b constructed and arranged so that the composite focal length of the first lens group G1 and the infinity-related lens group G2a of the second lens group G2 is nearly infinite. The movable lens group G2b may be slightly varied in position along the optical axis X in order to adjust the back focus of the retrofocus wide-angle lens so as to coincide precisely with the image plane 1. That arrangement makes possible easy adjustment to compensate for manufacturing tolerances that may slightly vary the position of the back focus along the optical axis without complicating the mechanism for connecting the retrofocus wide-angle lens to a camera body.

Four embodiments of the present invention will now be individually described with further reference to the drawings.

Embodiment 1

FIG. 1 shows the basic lens element configuration and lens group positions of the retrofocus wide-angle lens of the present invention. As shown in FIG. 1, the object-side lens group G1a, of the first lens group G1 that has a negative refractive power, includes, in order from the object side, first and second negative meniscus lens elements $L_1$ and $L_2$, each with its concave lens surface on the image side, a third biconcave lens element $L_3$, and a fourth positive meniscus lens element $L_4$ with its convex lens surface on the image side. Adjacent the object-side lens group G1a, on its image side, is the first light-receiving lens group G1b, formed of initial negative lens group G1bf that is a biconcave lens $L_5$, that moves for focusing and has its lens surface of greater curvature on the image side, and a lens component made of a biconvex lens element $L_6$ and a negative meniscus lens $L_7$ with its concave surface on the object side, with the adjacent lens surfaces of lens elements $L_6$ and $L_7$ joined by a thin layer of optical adhesive. On the image side of the first light-receiving lens group G1b, is the second light-receiving lens group G1c that is formed of a biconcave lens element $L_8$ with its lens surface of greater curvature on the image side and a biconvex lens element $L_9$ with its lens surface of greater curvature on the object side, with those lens surfaces of greater curvature bonded together.

Infinity-related lens group G2a, of the second lens group G2, includes a biconvex lens element $L_{10}$ and a negative meniscus lens element $L_{11}$ with its concave lens surface on the image side bonded to a biconvex lens element $L_{12}$. The movable lens group G2b, that moves to adjust the back focus, includes a negative meniscus lens element $L_{13}$ with its concave surface on the image side, and two biconvex lens elements $L_{14}$ and $L_{15}$, each of which has surfaces of different curvature. The negative meniscus lens element $L_{13}$ has its concave surface bonded to the biconvex lens element $L_{14}$ having a lens surface of greater curvature on the object side, and a biconvex lens element $L_{15}$ with its lens surface of greater curvature on the object side.

Table 1 below lists the surface number #, in order from the object side, the radius of curvature R (in mm) of each surface, the on-axis surface spacing D (in mm), as well as the refractive index $N_d$ and the Abbe number $\nu_d$ (at the d-line) of each lens element for Embodiment 1. Listed in the middle portion of Table 1 are the focal length f, the back focal length Bf, and the f-number $F_{NO}$ for Embodiment 1. Furthermore, listed in the bottom portion of Table 1 are the values corresponding to Conditions (1) and (2) for Embodiment 1.

TABLE 1

| # | R | D | $N_d$ | $\nu_d$ |
|---|---|---|---|---|
| 1 | 46.86 | 2.01 | 1.83480 | 42.7 |
| 2 | 26.06 | 6.11 | | |
| 3 | 95.63 | 1.90 | 1.80400 | 46.6 |
| 4 | 38.07 | 3.77 | | |
| 5 | −21696.15 | 1.80 | 1.80609 | 40.9 |
| 6 | 80.23 | 4.81 | | |
| 7 | −82.30 | 5.05 | 1.80439 | 39.6 |
| 8 | −34.28 | 6.67 | | |
| 9 | −445.23 | 1.69 | 1.49700 | 81.5* |
| 10 | 35.70 | 12.10 | | |
| 11 | 741.58 | 8.08 | 1.54814 | 45.8 |
| 12 | −16.76 | 2.13 | 1.49700 | 81.5* |
| 13 | −70.68 | 20.76 | | |
| 14 | −29.27 | 1.50 | 1.83480 | 42.7 |
| 15 | 20.48 | 6.19 | 1.67270 | 32.1 |
| 16 | −40.17 | 8.58 | | |
| 17 (stop) | ∞ | 23.21 | | |
| 18 | 81.82 | 6.95 | 1.48749 | 70.2 |
| 19 | −48.68 | 0.47 | | |
| 20 | 193.49 | 1.88 | 1.88299 | 40.7 |
| 21 | 37.07 | 6.93 | 1.49700 | 81.5* |
| 22 | −97.35 | 0.99 | | |
| 23 | 84.52 | 1.90 | 1.88299 | 40.7 |
| 24 | 35.13 | 6.33 | 1.49700 | 81.5* |
| 25 | −115.53 | 0.12 | | |
| 26 | 36.88 | 5.60 | 1.49700 | 81.5* |
| 27 | −222.20 | 5.00 | | |
| 28 | ∞ | 33.00 | 1.60859 | 46.4 |
| 29 | ∞ | 13.20 | 1.51680 | 64.1 | f = 8.28    Bf = 39.72    $F_{NO}$ = 1.44
Condition (1) value: fn/flb = 0.09 (fn = −66.42, flb = −715.1)
Condition (2) value: dN/dT = −0.0000061

A* beside $\nu_d$ above indicates which lens materials satisfy Condition (2). The anomalous dispersion glass lens elements are negative lens elements $L_5$ and $L_7$ and positive lens elements $L_{12}$, $L_{14}$, and $L_{15}$. The effective lens diameter of Embodiment 1 is 38.4 mm, which enables the design of a compact wide-angle lens.

FIGS. 2A–2E show the spherical aberration, astigmatism, distortion, lateral color, and coma, respectively, of the retrofocus wide-angle lens of Embodiment 1 at infinity focus. FIGS. 2F–2J show the spherical aberration, astigmatism, distortion, lateral color, and coma, respectively, of the retrofocus wide-angle lens of Embodiment 1 at a near point focus. In FIGS. 2A and 2F, the spherical aberration is shown for the d-line (λ=587.6 nm). In FIGS. 2B and 2G, the astigmatism is shown for both the sagittal image surface S and the tangential image surface T. In FIGS. 2D and 2I, the lateral color is shown for the wavelengths 626.3 nm (the C-line), and 436 nm (the g-line). In the remaining figures, the aberrations illustrated are for the d-line, and ω is the half-picture angle. As is apparent from these figures, the various aberrations are favorably corrected.

Embodiment 2

Embodiment 2 is very similar to Embodiment 1 and uses the same number of lens elements. Because Embodiment 2 is very similar to Embodiment 1, only the differences between Embodiment 2 and Embodiment 1 will be explained for Embodiment 2. In Embodiment 2, the third lens element $L_3$ in order from the object side, in object-side lens group G1$a$, is a negative meniscus lens element with its lens surface of greater curvature being concave and on the image side. Additionally, in the first light-receiving lens group G1$b$, the fifth lens element $L_5$ in order from the object side, that defines initial negative lens group G1$bf$, is a negative meniscus lens with its concave lens surface on the image side, and the sixth lens element $L_6$ is a positive meniscus lens with its convex lens surface on the image side.

Table 2 below lists the surface number #, in order from the object side, the radius of curvature R (in mm) of each surface, the on-axis surface spacing D (in mm), as well as the refractive index $N_d$ and the Abbe number $v_d$ (at the d-line) of each lens element for Embodiment 2. Listed in the middle portion of Table 2 are the focal length f, the back focal length Bf, and the f-number $F_{NO}$ for Embodiment 2. Furthermore, listed in the bottom portion of Table 2 are the values corresponding to Conditions (1) and (2) for Embodiment 2.

TABLE 2

| # | R | D | $N_d$ | $v_d$ |
|---|---|---|---|---|
| 1 | 42.74 | 2.01 | 1.83480 | 42.7 |
| 2 | 25.95 | 6.24 | | |
| 3 | 98.48 | 1.91 | 1.80400 | 46.6 |
| 4 | 34.93 | 4.04 | | |
| 5 | 1581.61 | 1.80 | 1.80609 | 40.9 |
| 6 | 66.98 | 7.53 | | |
| 7 | −125.37 | 4.86 | 1.80439 | 39.6 |
| 8 | −35.98 | 6.58 | | |
| 9 | 164.54 | 1.70 | 1.49700 | 81.5* |
| 10 | 29.37 | 6.51 | | |
| 11 | −4385.71 | 8.17 | 1.54814 | 45.8 |
| 12 | −16.22 | 1.88 | 1.49700 | 81.5* |
| 13 | −115.13 | 24.70 | | |
| 14 | −30.36 | 1.80 | 1.83480 | 42.7 |
| 15 | 21.80 | 6.12 | 1.67270 | 32.1 |
| 16 | −39.81 | 6.77 | | |
| 17 (stop) | ∞ | 22.00 | | |
| 18 | 81.13 | 8.35 | 1.48749 | 70.2 |
| 19 | −47.34 | 0.64 | | |
| 20 | 165.62 | 1.90 | 1.88299 | 40.7 |
| 21 | 35.11 | 7.13 | 1.49700 | 81.5* |
| 22 | −98.31 | 1.00 | | |
| 23 | 89.92 | 1.90 | 1.88299 | 40.7 |
| 24 | 36.91 | 6.11 | 1.49700 | 81.5* |
| 25 | −123.20 | 0.12 | | |
| 26 | 35.97 | 5.71 | 1.49700 | 81.5* |
| 27 | −221.23 | 5.00 | | |
| 28 | ∞ | 33.00 | 1.60859 | 46.4 |
| 29 | ∞ | 13.20 | 1.51680 | 64.1 | f = 8.33    Bf = 39.71    $F_{NO}$ = 1.44
Condition (1) value: fn/flb = 0.38 (fn = −72.24, flb = −190.30)
Condition (2) value: dN/dT = −0.0000061

A * beside $v_d$ above indicates which lens materials satisfy Condition (2). The anomalous dispersion glass lens elements are negative lens elements $L_5$ and $L_7$ and positive lens elements $L_{12}$, $L_{14}$, and $L_{15}$. The effective lens diameter of Embodiment 2 is 38.4 mm, which enables the design of a compact wide angle lens.

FIGS. 3A–3E show the spherical aberration, astigmatism, distortion, lateral color, and coma, respectively, of the retrofocus wide-angle lens of Embodiment 2 at infinity focus. FIGS. 3F–3J show the spherical aberration, astigmatism, distortion, lateral color, and coma, respectively, of the retrofocus wide-angle lens of Embodiment 2 at a near point focus. In FIGS. 3A and 3F, the spherical aberration is shown for the d-line ($\lambda$=587.6 nm). In FIGS. 3B and 3G, the astigmatism is shown for both the sagittal image surface S and the tangential image surface T. In FIGS. 3D and 3I, the lateral color is shown for the wavelengths 626.3 nm (the C-line), and 436 nm (the g-line). In the remaining figures, the aberrations illustrated are for the d-line, and ω is the half-picture angle. As is apparent from these figures, the various aberrations are favorably corrected.

Embodiment 3

Embodiment 3 is very similar to Embodiment 1 and uses the same number of lens elements. Because Embodiment 3 is very similar to Embodiment 1, only the differences between Embodiment 3 and Embodiment 1 will be explained for Embodiment 3. In Embodiment 3, the third lens element $L_3$ from the object side, in object-side lens group G1$a$, is a negative meniscus lens element with its lens surface of greater curvature being concave and on the image side. Additionally, in the first light-receiving lens group G1$b$, the sixth lens element $L_6$, which is the second lens from the object side in first light-receiving lens group G1$b$, is a positive meniscus lens with its convex lens surface on the image side.

Table 3 below lists the surface number #, in order from the object side, the radius of curvature R (in mm) of each surface, the on-axis surface spacing D (in mm), as well as the refractive index $N_d$ and the Abbe number $v_d$ (at the d-line) of each lens element for Embodiment 3. Listed in the middle portion of Table 3 are the focal length f, the back focal length Bf, and the f-number $F_{NO}$ for Embodiment 3. Furthermore, listed in the bottom portion of Table 3 are the values corresponding to Conditions (1) and (2) for Embodiment 3.

TABLE 3

| # | R | D | $N_d$ | $v_d$ |
|---|---|---|---|---|
| 1 | 53.25 | 2.00 | 1.83480 | 42.7 |
| 2 | 26.95 | 5.33 | | |
| 3 | 71.99 | 1.90 | 1.80400 | 46.6 |
| 4 | 39.18 | 3.75 | | |
| 5 | 2099.74 | 1.80 | 1.80609 | 40.9 |
| 6 | 84.46 | 4.19 | | |
| 7 | −103.98 | 4.81 | 1.80439 | 39.6 |
| 8 | −37.24 | 7.00 | | |
| 9 | −558.12 | 2.09 | 1.49700 | 81.5* |
| 10 | 29.60 | 8.78 | | |
| 11 | −335.02 | 7.55 | 1.54814 | 45.8 |
| 12 | −16.11 | 1.57 | 1.49700 | 81.5* |
| 13 | −79.17 | 23.87 | | |
| 14 | −31.17 | 1.67 | 1.83480 | 42.7 |
| 15 | 22.37 | 6.26 | 1.67270 | 32.1 |
| 16 | −34.98 | 8.16 | | |
| 17 (stop) | ∞ | 23.31 | | |
| 18 | 79.96 | 8.72 | 1.48749 | 70.2 |
| 19 | −49.51 | 0.96 | | |
| 20 | 207.36 | 1.90 | 1.88299 | 40.7 |
| 21 | 35.63 | 7.07 | 1.49700 | 81.5* |
| 22 | −96.13 | 1.00 | | |
| 23 | 103.08 | 1.90 | 1.88299 | 40.7 |
| 24 | 38.77 | 6.08 | 1.49700 | 81.5* |
| 25 | −104.45 | 0.12 | | |
| 26 | 35.85 | 5.90 | 1.49700 | 81.5* |
| 27 | −234.14 | 5.00 | | |
| 28 | ∞ | 33.00 | 1.60859 | 46.4 |

TABLE 3-continued

| | | | | |
|---|---|---|---|---|
| 29 | ∞ | 13.20 | 1.51680 | 64.1 |
| f = 8.49 | | Bf = 39.57 | $F_{NO}$ = 1.44 | |
| Condition (1) value: fn/flb = 0.43 (fn = −56.49, flb = −130.62) | | | | |
| Condition (2) value: dN/dT = −0.0000061 | | | | |

A * beside $v_d$ above indicates which lens materials satisy Condition (2). The anomalous dispersion glass lens elements are negative lens elements $L_5$ and $L_7$ and positive lens elements $L_{12}$, $L_{14}$, and $L_{15}$. The effective lens diameter of Embodiment 3 is 38.4 mm, which enables the design of a compact wide-angle lens.

FIGS. 4A–4E show the spherical aberration, astigmatism, distortion, lateral color, and coma, respectively, of the retrofocus wide-angle lens of Embodiment 3 at infinity focus. FIGS. 4F–4J show the spherical aberration, astigmatism, distortion, lateral color, and coma, respectively, of the retrofocus wide-angle lens of Embodiment 3 at a near point focus. In FIGS. 4A and 4F, the spherical aberration is shown for the d-line (λ=587.6 nm). In FIGS. 4B and 4G, the astigmatism is shown for both the sagittal image surface S and the tangential image surface T. In FIGS. 4D and 4I, the lateral color is shown for the wavelengths 626.3 nm (the C-line), and 436 nm (the g-line). In the remaining figures, the aberrations illustrated are for the d-line, and ω is the half-picture angle. As is apparent from these figures, the various aberrations are favorably corrected.

Embodiment 4

Embodiment 4 is very similar to Embodiment 1 but includes one more lens element. Because Embodiment 4 is very similar to Embodiment 1, only the differences between Embodiment 4 and Embodiment 1 will be explained for Embodiment 4. In Embodiment 4, object-side lens group G1a includes five lens elements with the first four lens elements from the object side being negative lens elements and the fifth lens from the object side being a positive lens element.

Table 4 below lists the surface number #, in order from the object side, the radius of curvature R (in mm) of each surface, the on-axis surface spacing D (in mm), as well as the refractive index $N_d$ and the Abbe number $v_d$ (at the d-line) of each lens element for Embodiment 4. Listed in the middle portion of Table 4 are the focal length f, the back focal length Bf, and the f-number $F_{NO}$ for Embodiment 4. Furthermore, listed in the bottom portion of Table 4 are the values corresponding to Conditions (1) and (2) for Embodiment 4.

TABLE 4

| # | R | D | $N_d$ | $v_d$ |
|---|---|---|---|---|
| 1 | 42.98 | 2.00 | 1.83480 | 42.7 |
| 2 | 24.65 | 5.31 | | |
| 3 | 107.63 | 1.90 | 1.80400 | 46.6 |
| 4 | 38.17 | 3.03 | | |
| 5 | 218.66 | 1.80 | 1.80099 | 35.0 |
| 6 | 86.38 | 2.23 | | |
| 7 | −215.81 | 1.80 | 1.80609 | 40.9 |
| 8 | 120.99 | 3.80 | | |
| 9 | −195.99 | 5.33 | 1.80439 | 39.6 |
| 10 | −33.87 | 5.61 | | |
| 11 | −1228.63 | 1.70 | 1.49700 | 81.5* |
| 12 | 27.92 | 11.00 | | |
| 13 | 175.03 | 7.95 | 1.54072 | 47.2 |
| 14 | −16.07 | 1.50 | 1.49700 | 81.5* |
| 15 | −111.25 | 28.71 | | |
| 16 | −32.69 | 1.44 | 1.83480 | 42.7 |
| 17 | 23.54 | 4.81 | 1.66680 | 33.0 |
| 18 | −35.97 | 4.69 | | |
| 19 (stop) | ∞ | 22.67 | | |
| 20 | 73.81 | 7.40 | 1.48749 | 70.2 |
| 21 | −44.44 | 0.17 | | |
| 22 | 200.77 | 1.30 | 1.88299 | 40.7 |
| 23 | 31.11 | 7.60 | 1.49700 | 81.5* |
| 24 | −111.57 | 0.95 | | |
| 25 | 90.56 | 1.30 | 1.88299 | 40.7 |
| 26 | 41.62 | 5.75 | 1.49700 | 81.5* |
| 27 | −138.61 | 0.12 | | |
| 28 | 37.26 | 6.03 | 1.49700 | 81.5* |
| 29 | −154.08 | 5.00 | | |
| 30 | ∞ | 33.00 | 1.60859 | 46.4 |
| 31 | ∞ | 13.2 | 1.51680 | 64.1 |
| f = 8.29 | | Bf = 39.22 | $F_{NO}$ = 1.44 | |
| Condition (1) value: fn/flb = 0.29 (fn = −54.79, flb = −188.12) | | | | |
| Condition (2) value: dN/dT = −0.0000061 | | | | |

A * beside $v_d$ above indicates which lens materials satisfy Condition (2). The anomalous dispersion glass lens elements are negative lens elements $L_6$ and $L_8$ and positive lens elements $L_{13}$, $L_{15}$, and $L_{16}$. The effective lens diameter of Embodiment 4 is 36.6 mm, which enables the design of a compact wide-angle lens.

FIGS. 5A–5E show the spherical aberration, astigmatism, distortion, lateral color, and coma, respectively, of the retrofocus wide-angle lens of Embodiment 4 at infinity focus. FIGS. 5F–5J show the spherical aberration, astigmatism, distortion, lateral color, and coma, respectively, of the retrofocus wide-angle lens of Embodiment 4 at a near point focus. In FIGS. 5A and 5F, the spherical aberration is shown for the d-line (λ=587.6 mn). In FIGS. 5B and 5G, the astigmatism is shown for both the sagittal image surface S and the tangential image surface T. In FIGS. 5D and 5I, the lateral color is shown for the wavelengths 626.3 nm (the C-line), and 436 nm (the g-line). In the remaining figures, the aberrations illustrated are for the d-line, and ω is the half-picture angle. As is apparent from these figures, the various aberrations are favorably corrected.

The present invention is not limited to the aforementioned embodiments, as it will be obvious that various alternative implementations are possible. For instance, values such as the radius of curvature R of each of the lens elements, the surface spacings D, the refractive index N, as well as Abbe number $v_d$, are not limited to the examples indicated in each of the aforementioned embodiments, as other values can be adopted. Additionally, the retrofocus wide-angle lens of the present invention may be used in various image forming devices other than the cameras discussed above. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A retrofocus wide-angle lens formed of only two lens groups, in order from the object side, as follows:
    a first lens group of negative refractive power;
    a diaphragm; and
    a second lens group of positive refractive power;
wherein
    said first lens group includes, in order from the object side, an object-side lens group, a first light-receiving lens group, and a second light-receiving lens group;
    said object-side lens group includes, in order from the object side, a plurality of negative lens components and a positive meniscus lens component with its convex surface on the image side;

said first light-receiving lens group includes an initial negative lens group that includes a negative lens component that is at the object side of said first light-receiving lens group; and said second light-receiving lens group includes a negative lens element and a positive lens element.

2. The retrofocus wide-angle lens of claim 1, wherein said initial negative lens group moves toward the object side when the retrofocus wide-angle lens is focused from infinity toward a near point, and wherein the following condition is satisfied:

$$0.05 < fn/flb < 0.50$$

where fn is the focal length of said initial negative lens group; and flb is the focal length of said first light-receiving lens group.

3. The retrofocus wide-angle lens of claim 1, wherein said- second lens group includes a positive lens element made of anomalous dispersion glass, and said first lens group includes a negative lens element made of a material that has a refractive index N that satisfies the following condition:

$$dN/dT < -0.000005$$

where dN/dT is the change in the refractive index N with change in temperature T, in degrees Celsius.

4. The retrofocus wide-angle lens of claim 1, wherein said second lens group includes, in order from the object side, an infinity-related lens group and a movable lens group constructed and arranged so that the composite focal length of the first lens group and the infinity-related lens group is nearly infinite, and the movable lens group may be slightly varied in position along the optical axis X in order to adjust the back focus of the retrofocus wide-angle lens so as to coincide precisely with the image plane.

5. The retrofocus wide-angle lens of claim 2, wherein said second lens group includes, in order from the object side, an infinity-related lens group and a movable lens group constructed and arranged so that the composite focal length of the first lens group and the infinity-related lens group is nearly infinite, and the movable lens group may be slightly varied in position along the optical axis X in order to adjust the back focus of the retrofocus wide-angle lens so as to coincide precisely with the image plane.

6. The retrofocus wide-angle lens of claim 3, wherein said second lens group includes, in order from the object side, an infinity-related lens group and a movable lens group constructed and arranged so that the composite focal length of the first lens group and the infinity-related lens group is nearly infinite, and the movable lens group may be slightly varied in position along the optical axis X in order to adjust the back focus of the retrofocus wide-angle lens so as to coincide precisely with the image plane.

7. The retrofocus wide-angle lens of claim 1, wherein the retrofocus wide-angle lens is mounted in a lens barrel.

8. The retrofocus wide-angle lens of claim 2, wherein the retrofocus wide-angle lens is mounted in a lens barrel.

9. The retrofocus wide-angle lens of claim 3, wherein the retrofocus wide-angle lens is mounted in a lens barrel.

10. The retrofocus wide-angle lens of claim 4, wherein the retrofocus wide-angle lens is mounted in a lens barrel.

11. The retrofocus wide-angle lens of claim 5, wherein the retrofocus wide-angle lens is mounted in a lens barrel.

12. The retrofocus wide-angle lens of claim 6, wherein the retrofocus wide-angle lens is mounted in a lens barrel.

13. The retrofocus wide-angle lens of claim 1, wherein said initial negative lens group consists of a negative lens component.

14. The retrofocus wide-angle lens of claim 2, wherein said initial negative lens group consists of a negative lens component.

15. The retrofocus wide-angle lens of claim 3, wherein said initial negative lens group consists of a negative lens component.

16. The retrofocus wide-angle lens of claim 4, wherein said initial negative lens group consists of a negative lens component.

17. The retrofocus wide-angle lens of claim 1, wherein said initial negative lens group consists of a negative lens element.

18. The retrofocus wide-angle lens of claim 2, wherein said initial negative lens group consists of a negative lens element.

19. The retrofocus wide-angle lens of claim 3, wherein said initial negative lens group consists of a negative lens element.

20. The retrofocus wide-angle lens of claim 4, wherein said initial negative lens group consists of a negative lens element.

* * * * *

UNITED STATES PATENT AND TRADEMARK OFFICE
CERTIFICATE OF CORRECTION

PATENT NO. : 6,747,815 B2
DATED : June 8, 2004
INVENTOR(S) : Takatsuki

It is certified that error appears in the above-identified patent and that said Letters Patent is hereby corrected as shown below:

Column 5,
Line 11, change "collected" to -- corrected --;
Line 51, change "lens $L_5$," to -- lens $L_5$ --;

Column 8,
Line 57, in table 3, first column, change "17" to -- 17 (stop) --;
Line 58, in table 3, first column, delete "(stop)";

Column 10,
Line 5, in table 4, first column, change "19" to -- 19 (stop) --;
Line 6, in table 4, first column, delete "(stop)"; and Column 11,
Line 23, change "said- second" to -- said second --.

Signed and Sealed this

Twenty-first Day of December, 2004

JON W. DUDAS
*Director of the United States Patent and Trademark Office*